(12) United States Patent
Suh et al.

(10) Patent No.: US 9,264,949 B1
(45) Date of Patent: *Feb. 16, 2016

(54) METHOD AND SYSTEM FOR MANAGING SECURITY IN MOBILE COMMUNICATION SYSTEM

(71) Applicant: Samsung Electronics Co., Ltd., Suwon-si, Gyeonggi-do (KR)

(72) Inventors: Kyung-Joo Suh, Seoul (KR); Chae-Gwon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,503

(22) Filed: Oct. 6, 2015

Related U.S. Application Data

(63) Continuation of application No. 14/844,737, filed on Sep. 3, 2015, which is a continuation of application No. 14/532,421, filed on Nov. 4, 2014, now Pat. No. 9,131,380, which is a continuation of application No. 13/504,786, filed as application No. PCT/KR2010/007430 on Oct. 27, 2010, now Pat. No. 8,881,237.

(30) Foreign Application Priority Data

Oct. 27, 2009 (KR) .................. 10-2009-0102501

(51) Int. Cl.
*G06F 21/00* (2013.01)
*H04L 29/06* (2006.01)
(Continued)

(52) U.S. Cl.
CPC .......... *H04W 36/0038* (2013.01); *H04W 12/06* (2013.01); *H04W 84/042* (2013.01)

(58) Field of Classification Search
CPC ............ H04W 36/0038; H04W 12/06; H04W 84/042
See application file for complete search history.

(56) References Cited

U.S. PATENT DOCUMENTS

| 8,144,877 B2 | 3/2012 | Yang et al. |
| 2008/0267407 A1 | 10/2008 | Vanderveen |

(Continued)

FOREIGN PATENT DOCUMENTS

| EP | 1 860 904 A1 | 11/2007 | |
| EP | 2 018 083 A1 | 1/2009 | |
| EP | 2288185 A1 * | 2/2011 | ........ H04W 36/0033 |

OTHER PUBLICATIONS

Myungseok Song; Jae-Young Choi; Jun-dong Cho; Jongpil Jeong; Byung-Hun Song; Hyungsu Lee; "Reduction of authentication cost based on key caching for inter-MME handover support"; High Performance Computing & Simulation (HPCS), 2014 International Conference on Year: Apr. 2014; pp. 885-892.*

(Continued)

*Primary Examiner* — Amir Mehrmanesh
*Assistant Examiner* — Courtney Fields
(74) *Attorney, Agent, or Firm* — Jefferson IP Law, LLP

(57) ABSTRACT

A method, an apparatus, and a system for solving and managing security problems, which may occur during a handover of a User Equipment (UE) between PLMNs in a mobile communication network, by using a Non-Access Stratum (NAS) protocol are provided. By the method, a UE can perform a security mode command and an authentication with a network. Further, the method can prevent interruption of communication due to authentication or security during a handover of a UE between Public Land Mobile Networks (PLMNs).

17 Claims, 11 Drawing Sheets

(51) Int. Cl.
  *H04W 36/00*  (2009.01)
  *H04W 12/06*  (2009.01)
  *H04W 4/00*  (2009.01)
  *H04W 12/02*  (2009.01)
  *H04W 84/04*  (2009.01)

(56) References Cited

U.S. PATENT DOCUMENTS

2009/0061878 A1  3/2009  Fischer
2009/0305699 A1  12/2009  Deshpande et al.
2010/0054472 A1  3/2010  Barany et al.
2010/0081435 A1  4/2010  Huang

OTHER PUBLICATIONS

Mitjana et al., "Background Scan Mechanism whereby PLMN is able to instruct a capable mobile terminal to perform regular attempts"; Siemens AG; IPCOM000125707D; Jul. 2005; pp. 1-2.
Jeong et al., "HIMALIS-C-ITS: Fast and secure mobility management scheme based on HIMALIS for cooperative ITS service in future networks", Ubiquitous and Future Networks (ICUFN), 2013 Fifth International Conference on year, Jan. 2013, pp. 60-65.

* cited by examiner

METHOD AND SYSTEM FOR MANAGING SECURITY IN MOBILE COMMUNICATION SYSTEM

CROSS-REFERENCE TO RELATED APPLICATION(S)

This application is a continuation application of prior application Ser. No. 14/844,737, filed on Sep. 3, 2015, which is a continuation application of prior application Ser. No. 14/532,421, filed on Nov. 4, 2014, which issued as U.S. Pat. No. 9,131,380 on Sep. 8, 2015, and claimed the benefit under 35 U.S.C §119(a) of a U.S. patent application filed on Apr. 27, 2012, in the U.S. Patent and Trademark Office and assigned Ser. No. 13/504,786, which issued as U.S. Pat. No. 8,881,237 on Nov. 4, 2014, and which was the U.S. National Stage application under 35 U.S.C. §371 of an International Application filed on Oct. 27, 2010, and assigned application number PCT/KR2010/007430, which claimed the benefit under 35 U.S.C. §365(b) of a Korean patent application filed in the Korean Industrial Property Office on Oct. 27, 2009, and assigned Serial number 10-2009-0102501, the entire disclosure of each of which is hereby incorporated by reference.

BACKGROUND OF THE INVENTION

1. Field of the Invention

The present invention relates to a mobile communication system. More particularly, the present invention relates to a method and a system for managing a security and an authentication of a User Equipment (UE) and a network in an environment in which the UE performs a handover.

2. Description of the Related Art

The 3rd Generation Partnership Project (3GPP), which is a representative organization for establishing standards for a mobile communication system, has defined an Evolved Packet System (EPS) for the next generation communication and has employed the Mobility Management Entity (MME) as a mobility management entity of a network. For the mobile communication system as described above, a solution improved from the Non-Access Stratum (NAS) protocol, which has been used in the conventional mobile communication systems, such as a 3GPP communication system, has been presented in order to provide a high speed communication service in the next generation mobile communication. In the improved solution, a security management scheme has been enhanced by employing, in performing a security mode, the concept of a NAS protocol, which provides a security to a NAS, in addition to a security process performed in a wireless access stratum and a conventional authentication process.

However, according to the current NAS protocol definition and the current NAS protocol security definition, the security may not be ensured or the communication may be interrupted in supporting a handover between Public Land Mobile Networks (PLMNs). Therefore, a need exists for a method capable of supporting the communication, the security, and the authentication between a UE and a network in an efficient and incessant manner even though the PLMN changes, through an improvement of a NAS security mode command process introduced in order to enhance the NAS protocol and the authentication process.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and a method for security management using a Non-Access Stratum (NAS) protocol during a handover of a UE by a mobility management entity in a mobile communication system.

Another aspect of the present invention is to provide a system and a method for security management in a mobile communication system, which enables smooth operations of authentication and security modes even during a handover of a User Equipment (UE) between Public Land Mobile Networks (PLMNs) by using a NAS protocol, thereby achieving an efficient mobility management of the UE.

In accordance with an aspect of the present invention, a method of managing a security during a handover of a User Equipment (UE) by a Mobility Management Entity (MME) of a mobile communication system is provided. The method includes comparing a network identity included in a Tracking Area Update (TAU) request message received from the UE with a network identity of the MME, and determining whether to transmit an authentication request message, based on a result of the comparison between the network identities.

In accordance with another aspect of the present invention, a method of managing a security during a handover of a UE in a mobile communication system is provided. The method includes transmitting a TAU request message to an MME, and receiving an authentication request message from the MME according to a result of comparison between a network identity included in the TAU request message and a network identity of the MME.

In accordance with another aspect of the present invention, a method of managing a security during a handover of a UE by an MME of a mobile communication system is provided. The method includes receiving a TAU request message from the UE, comparing a network identity included in the TAU request message with a network identity of the MME, and determining whether to transmit a Security Mode Command (SMC) message to the UE as a result of the comparison.

In accordance with another aspect of the present invention, a method of managing a security during a handover of a UE in a mobile communication system is provided. The method includes transmitting a TAU request message to an MME, and receiving an SMC message from the MME according to a result of comparison between a network identity included in the TAU request message and a network identity of the MME.

In accordance with another aspect of the present invention, an apparatus for managing a security during a handover of a UE by an MME of a mobile communication system is provided. The apparatus includes a control unit for comparing a network identity included in a TAU request message received from the UE with a network identity of the MME, and for determining whether to transmit an authentication request message, based on a result of the comparison between the network identities.

In accordance with another aspect of the present invention, an apparatus for managing a security during a handover of a UE in a mobile communication system is provided. The apparatus includes a control unit for transmitting a TAU request message to an MME, and for receiving an authentication request message from the MME according to a result of comparison between a network identity included in the TAU request message and a network identity of the MME.

In accordance with another aspect of the present invention, an apparatus for managing a security during a handover of a UE in a mobile communication system is provided. The apparatus includes a control unit for transmitting a TAU request message to an MME, and for receiving an SMC message from the MME according to a result of comparison between a network identity included in the TAU request message and a network identity of the MME.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A main idea of the exemplary embodiments of the present invention is to provide an incessant mobile communication for a mobile communication system during a handover of a User Equipment (UE) between Public Land Mobile Networks (PLMNs) by using a Non-Access Stratum (NAS) protocol which is a protocol between a UE and a Mobility Management Entity (MME). Further, exemplary embodiments of the present invention provide a method of supporting an authentication and the security and management of a NAS protocol, which is a protocol between a UE and an MME for authentication. The following detailed description of exemplary embodiments of the present invention discusses a 3GPP-based Evolved Packet System (EPS) system, Universal Terrestrial Radio Access Network (UTRAN), and GSM EDGE Radio Access Network (GERAN), although exemplary embodiments of the present invention can be used by another mobile communication system using a NAS protocol.

Figure 1:
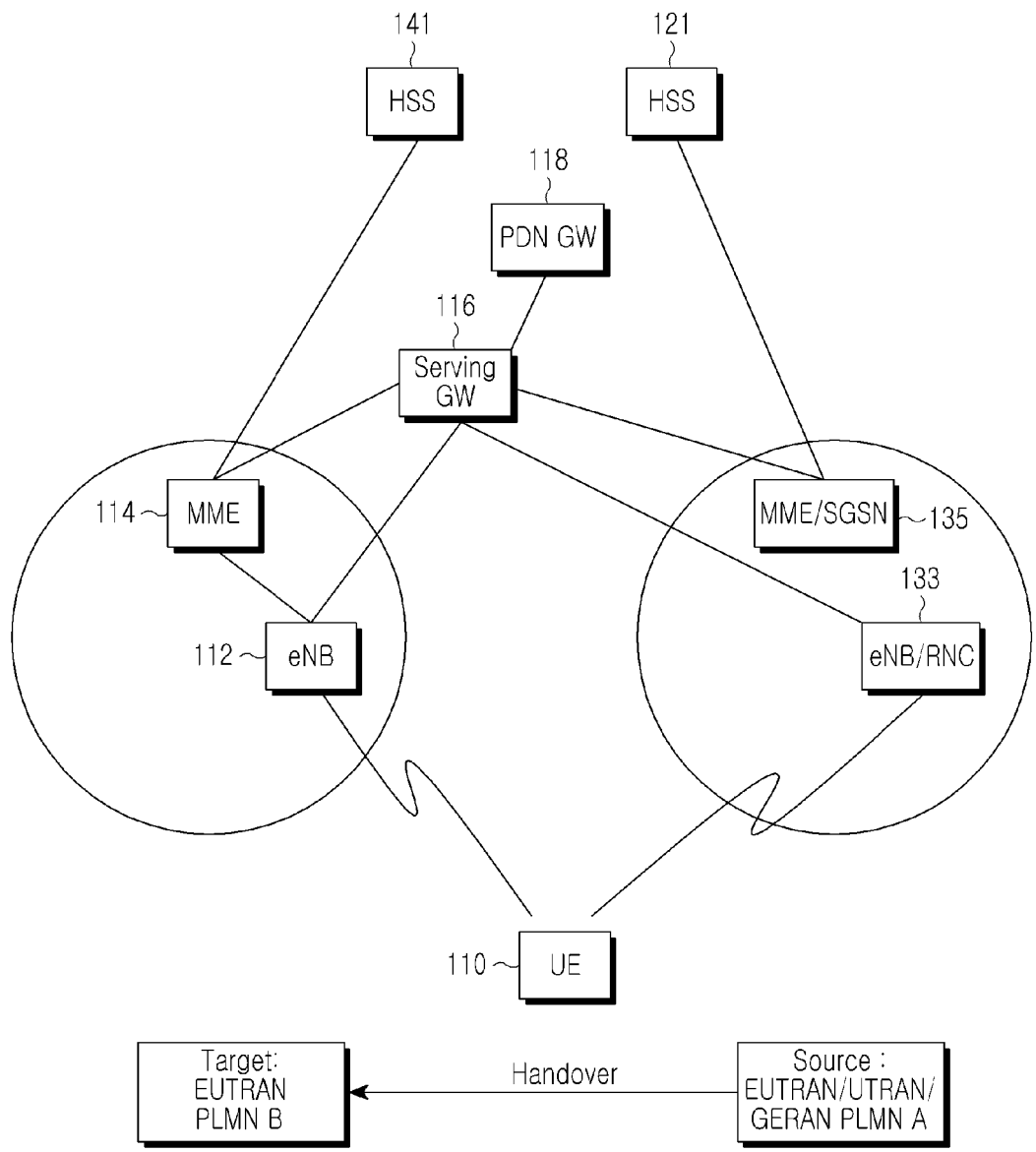
FIG. 1 is a block diagram illustrating a Public Land Mobile Network (PLMN) handover and security environment in a mobile communication system according to an exemplary embodiment of the present invention.

Meanwhile, as shown in FIG. 1, the exemplary embodiment of the present invention shown in FIG. 1 proposes a method of supporting an authentication and a security for communication between a UE and an MME by using a NAS protocol when a UE moves from an Evolved UTRAN (EUTRAN) or another Radio Access Technology (RAT) to another EUTRAN, and this method can be applied to other mobile communication systems, which have similar technical backgrounds, channel types, network architectures, or protocols, or perform similar operations with different protocols, with small modifications without departing from the scope of the present invention, as apparent to those skilled in the art.

FIG. 1 is a block diagram illustrating a PLMN handover and security environment in a mobile communication system according to an exemplary embodiment of the present invention. As an example, a 3GPP EPS system structure has been described in FIG. 1. The following description of exemplary embodiments of the present invention mainly discusses potential problems associated with when a UE moves from a EUTRAN or another RAT to another EUTRAN. According to exemplary embodiments of the present invention, the method can be used by another similar mobile communication system.

Referring to FIG. 1, an Evolved Node Base Station (E Node B; eNB)/Radio Network Controller (RNC) 133 establishes a radio access and performs a communication with a UE 110 located within a service area of itself. The UE 110 refers to a terminal or UE accessing a packet data network, such as the Internet, through a Serving Gateway (SGW) 116. As described herein, a Packet Data Network Gateway (PDN GW) 118 as an important network entity of a packet data network that serves as a Home Agent (HA).

Meanwhile, a Mobility Management Entity (MME)/Serving GPRS Support Node (SGSN) 135 performs a mobility management, a location management, and a registration of a UE. Further, a Home Subscriber Server (HSS) 121 for managing authentication information and service information for a user and a UE is connected to the MME/SGSN 135 through an interface.

A data path exists between the eNB/RNC 133 and the Serving GW 116, and a control path or an interface for managing the mobility of a UE exists between the MME/SGSN 135 and the Serving GW 116. According to exemplary embodiments of the present invention, the UE 110 and the MME/SGSN 135 communicate with each other using a NAS protocol stack, thereby performing the mobility management and session management.

Exemplary embodiments of the present invention address a situation in which a UE 110 connected to a source network performs a handover. It is assumed that the source network may be one RAT among various types of RATs, such as a EUTRAN, UTRAN, and GERAN, and the PLMN of the source network is different from the PLMN to which the UE 110 will move. That is, exemplary embodiments of the present invention attempt to resolve problems associated with a handover situation of a UE 110 in which the PLMN changes from PLMN A to PLMN B during the handoff of the UE 110 from a source network to a target network and the target network supports the EUTRAN. Therefore, when the UE 110 performs a handover from a source network to a target network, the UE 110 is connected to the target eNB 112, the target MME 114, and the target HSS 141, and receives a service from them. FIGS. 2 to 11 will be described with reference to the above-mentioned network according to exemplary embodiments of the present invention for an efficient operation and the UE 110 and the MME 114 based on a NAS protocol.

Figure 2:
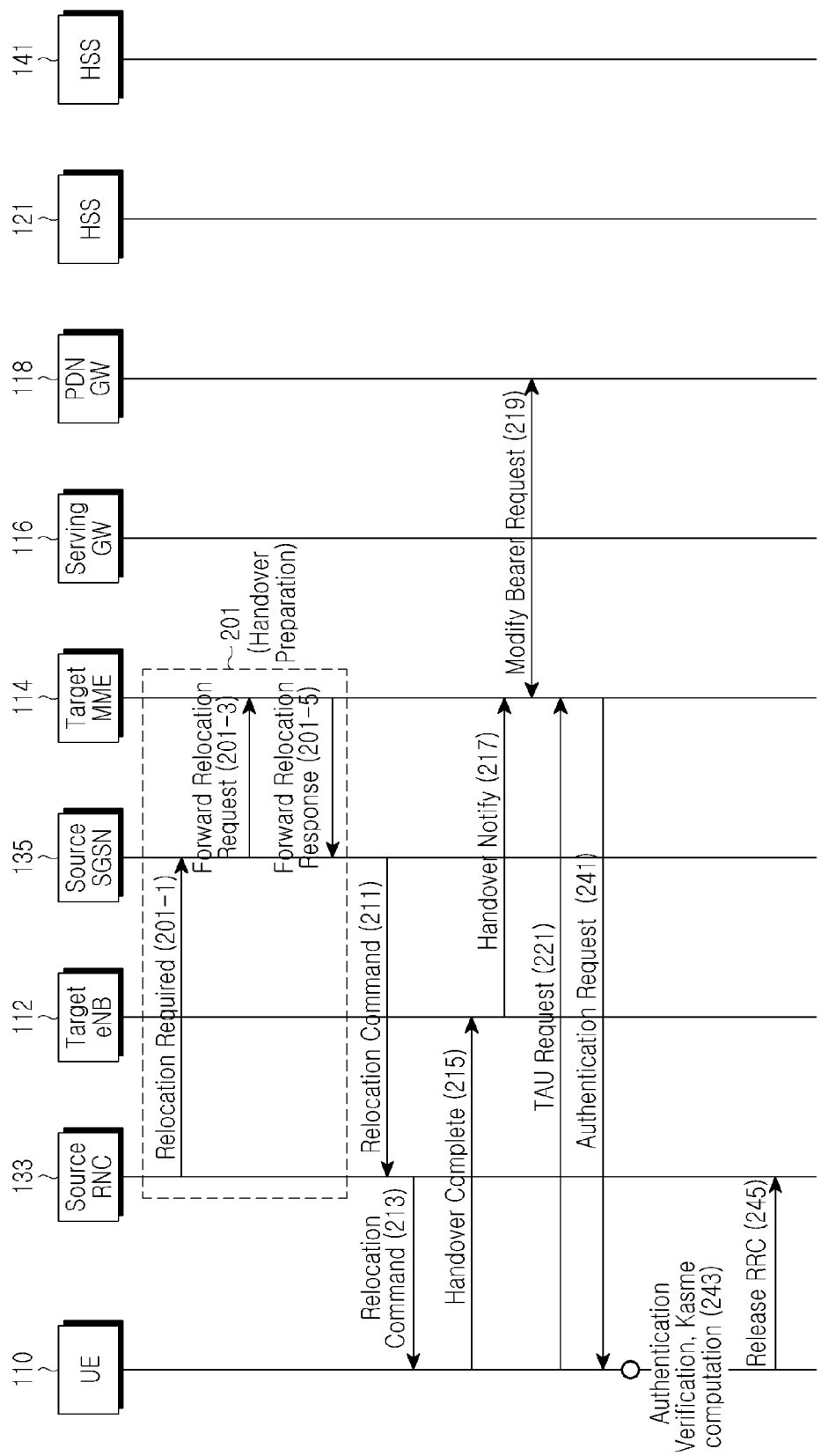
FIG. 2 is a message flow diagram illustrating a process of authentication during a handover between PLMNs according to an exemplary embodiment of the present invention.

FIG. 2 is a message flow diagram illustrating a process of authentication during a handover between PLMNs according to an exemplary embodiment of the present invention.

Step 201 corresponds to a handover preparation step. That is, step 201 corresponds to a step of requesting a core network to provide resources, which includes a step of making requests for resource preparation by the target eNB 112, the target MME 114, and the serving GW 116. In this step, a bearer context or mobility management context is transmitted from a source system to a target system for the requesting.

The handover preparation step includes the following substeps. When the source eNB/RNC 133 transmits a "relocation required" message to the source MME/SGSN 135 in step 201-1, the source MME/SGSN 135 forwards a relocation request message to the target MME 114 in step 201-3. Then, in step 201-5, the target MME 114 forwards a relocation response message to the source MME/SGSN 135.

In step 211, the source MME/SGSN 135 sends a relocation command message to the source eNB/RNC 133, thereby notifying the source eNB/RNC 133 that the handover preparation step has been completed. Then, the source eNB/RNC 133 transmits a handover command message to the UE 110 in step 213, and the UE 110 issues a handover command to the target eNB 112 in step 215. When the UE 110 has performed a handover to the target eNB 112, the target eNB 112 transmits a handover notification message to the target MME 114 in step 217. Thereafter, in step 219, if there is a change in the serving GW 116, a bearer modification request is made by the target MME 114, the serving GW 116, or the PDN GW 118. In step 221, during the handover process, the UE 110 transmits a Tracking Area Update (TAU) request message to the target MME 114. Thereafter, the target MME 114 inserts a PLMN Identity (ID) in a TAU response message, which is not shown in the drawings, and then sends the TAU response message to the UE 110. Then, the UE 110 can obtain a network ID of the serving network, which provides a service to the UE 110. The network ID includes a serving network ID and the PLMN ID. Therefore, even though the authentication thereafter is started in the target MME 114, no problem occurs in the authentication because the UE 110 and the target MME 114 share the PLMN ID (e.g., the ID of the PLMN B).

Referring to FIG. 2, when the target MME 114 transmits an authentication request message to the UE 110 as in step 241 while the target MME 114 processes the TAU request message received in step 221, the UE 110 verifies an authentication vector in step 243. At this time, because the UE 110 has not received a response (e.g., TAU response message) in response to the TAU request message, the UE 110 uses the PLMN ID (e.g., PLMN A), which is the currently known ID of the serving network, in calculation for verifying the authentication vector, which results in a failure in the verification of the entire authentication vector. As a result, the Radio Resource Control (RRC) connection between the UE 110 and the source eNB/RNC 133 is interrupted in step 245, which causes a problem.

Figure 3:
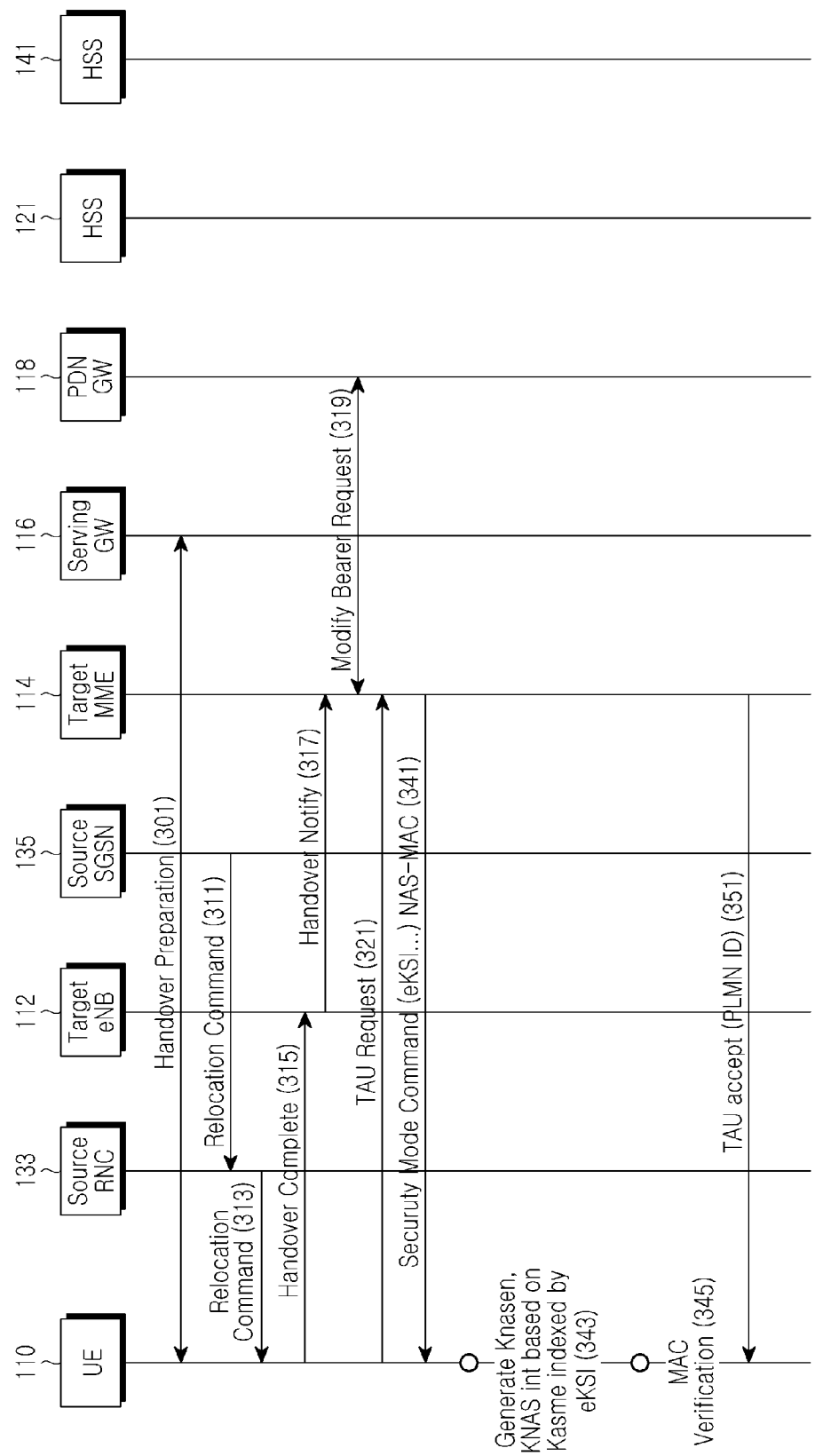
FIG. 3 is a message flow diagram illustrating a Security Mode Command (SMC) process during a handover between PLMNs according to an exemplary embodiment of the present invention.

FIG. 3 is a message flow diagram illustrating a Security Mode Command (SMC) process during a handover between PLMNs according to an exemplary embodiment of the present invention.

Referring to FIG. 3, the exemplary embodiment of the present invention is described in relation to an example which is hereinafter referred to as SMC case 1.

Step 301 corresponds to a handover preparation step. Step 301 is identical to the handover preparation step 201, so a detailed description thereof will be omitted here.

In step 311, the source MME/SGSN 135 sends a relocation command message to the source eNB/RNC 133, thereby notifying the source eNB/RNC 133 that the handover preparation step has been completed. Then, the source eNB/RNC 133 transmits a handover command message to the UE 110 in step 313, and the UE 110 issues a handover command to the target eNB 112. When the UE 110 completes the handover process to the target eNB 112 in step 315, the target eNB 112 transmits a handover notification message to the target MME 114 in step 317. Thereafter, in step 319, if there is a change in the serving GW 116, etc., a bearer modification request is made by the target MME 114, the serving GW 116, or the PDN GW 118. In step 321, during the handover process, the UE 110 transmits a Tracking Area Update (TAU) request message to the target MME 114. Thereafter, the target MME 114 inserts a PLMN Identity (ID) in a TAU response message, which is not shown in the drawings, and then sends the TAU response message to the UE 110. Then, the UE 110 can obtain a network ID of the serving network, which provides a service to the UE 110. Therefore, even though the security mode command process thereafter is started in the target MME 114, no problem occurs in executing the security mode command since the UE 110 and the target MME 114 share the PLMN ID (e.g., the ID of the PLMN B).

However, referring to FIG. 3, the target MME 114 transmits a security mode command message to the UE 110 as in step 341 while it processes the TAU request message received in step 321. Then, in step 343, the UE 110 searches for an authentication key through an NAS Key Set Identity (eKSI). At this time, because the UE 110 has not received a response (e.g., a TAU response message) in response to the TAU request message, the serving network ID currently known to the UE 110 is the PLMN ID (PLMN A). However, due to the same eKSI in spite of different authentication values KASME, a NAS encryption key, and a NAS integrity key are generated based on the different authentication keys. Thereafter, when the UE 110 verifies the NAS Message Authentication Code (MAC) value in step 345, the UE 110 fails in deciphering the MAC because the integrity keys are different. As a result, a Radio Resource Control (RRC) protocol connection between the UE 110 and the source eNB/RNC 133 may be interrupted, which causes a problem. In step 351, the target MME 114 transmits a TAU accept message to the UE 110. In the following description of exemplary embodiments of the present invention (as shown in FIGS. 4 to 11), the operations of the UE are performed by a control unit (not shown) within the UE, and the operations of the MME are performed by a control unit (not shown) within the MME.

Figure 4:
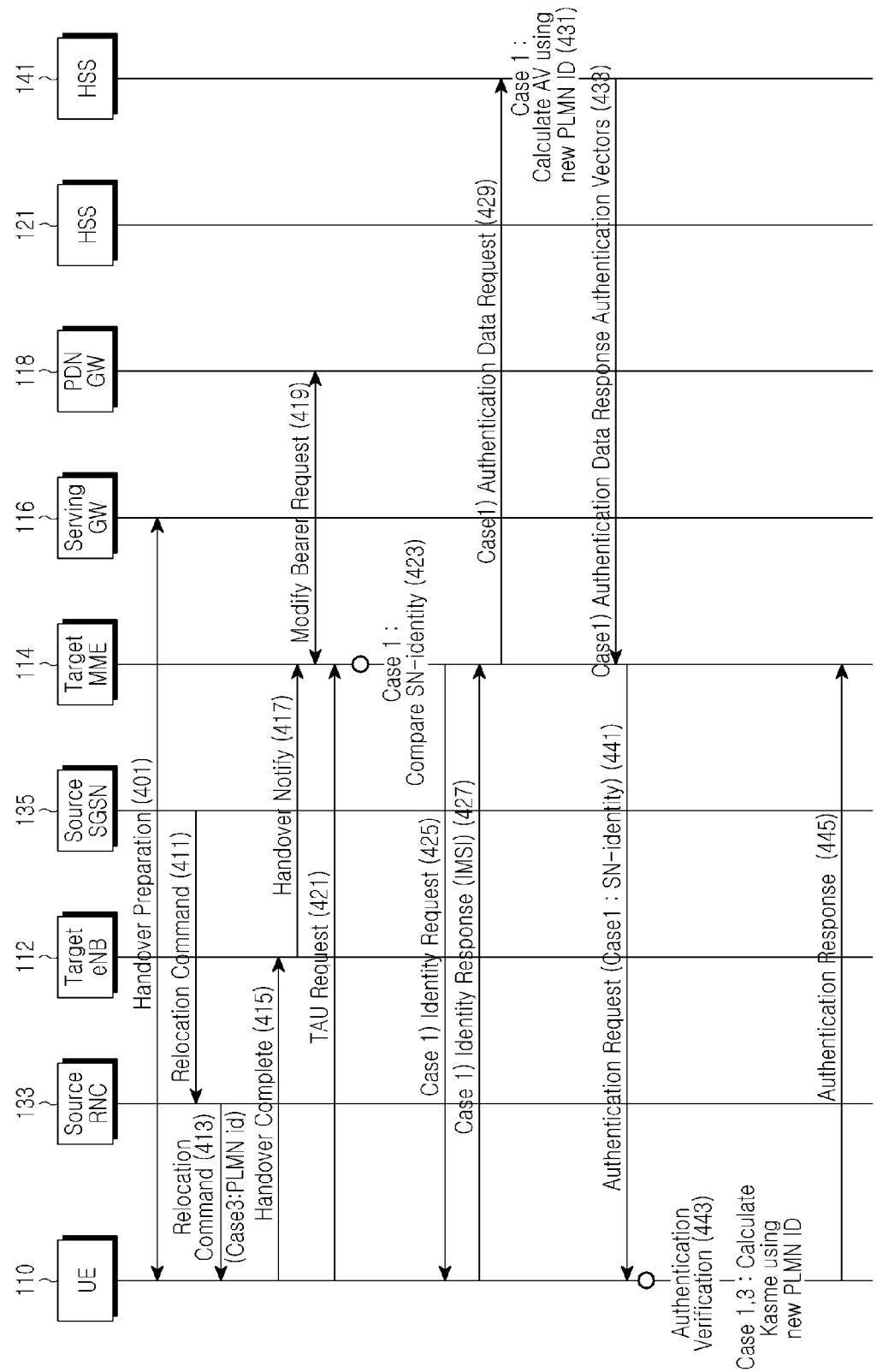
FIG. 4 is a message flow diagram illustrating an authentication process during a handover between PLMNs according to an exemplary embodiment of the present invention.

FIG. 4 is a message flow diagram illustrating an authentication process during a handover between PLMNs according to an exemplary embodiment of the present invention.

Referring to FIG. 4, the exemplary embodiment of the present invention is described in relation to the example identified as SMC case 1.

Step 401 corresponds to a handover preparation step. Step 401 is identical to the handover preparation step 201, so a detailed description thereof will be omitted here.

In step 411, the source MME/SGSN 135 sends a relocation command message to the source eNB/RNC 133, thereby notifying the source eNB/RNC 133 that the handover preparation step has been completed. Then, the source eNB/RNC 133 transmits a handover command message to the UE 110 in step 413, and the UE 110 issues a handover command to the target eNB 112. When the UE 110 completes the handover process to the target eNB 112 in step 415, the target eNB 112 transmits a handover notification message to the target MME 114 in step 417. Thereafter, in step 419, if there is a change in the serving GW 116, etc., a bearer modification request is made by the target MME 114, the serving GW 116, the PDN GW 118, etc. In step 421, during the handover process, the UE 110 transmits a Tracking Area Update (TAU) request message to the target MME 114. Thereafter, in step 423, the MME 114 compares the PLMN ID of the MME 114 itself and the PLMN ID included in the information transmitted from the UE 110. When the two IDs are different, the MME 114 sends an identity request message to the UE 110 in step 425. In step 427, the UE 110 transmits an identity response message including an International Mobile Station Identity (IMSI) of itself to the target MME 114. In step 429, the target MME 114 transmits an authentication data request message to the HSS 141. In step 431, the HSS 141 calculates an authentication vector based on a new PLMN identity. Then, the HSS 141 transmits a random number (RAND), an authentication key (KASME), and an authentication token (AUTN) to the target MME 114 through an authentication data response step as step 433. Thereafter, the target MME 114 transmits an authentication request message including a serving network identity (i.e. PLMN identity) to the UE 110 in step 441. The authentication request message further includes an AUTN and a random challenge (RAND), which are a part of the authentication vector, in addition to the PLMN identity. In step 443, the UE 110 verifies the authentication vector and calculates the authentication key ($K_{ASME}$) by using the new PLMN identity transmitted from the MME 114. Thereafter, in step 445, the UE 110 transmits an authentication response message to the target MME 114 in step 445. At this time, the authentication response message sent from the UE 110 to the target MME 114 includes an RES, which is a response parameter calculated by the UE 110. The RES may include the calculated authentication key ($K_{ASME}$).

In the meantime, the target MME 114 verifies if a received authentication response message is an authentication response message transmitted from the UE, to which the target MME itself has sent the authentication request, by comparing the RES included in the received authentication response message with an expected response (XRES).

Although FIG. 4 is based on an assumption that there is no transfer of a PLMN identity by the eNB/RNC 133 through a handover command in step 413, a PLMN identity may be transferred through a handover command by the eNB/RNC 133 in step 413 in the case of another embodiment (authentication case 3). Then, even when the TAU request message has been transmitted from the UE 110 to the target MME 114 as in step 421, the UE 110 and the MME 114 can have the same PLMN ID even without performing steps 423 to 441. Therefore, the authentication process, security process, and communication thereafter can be incessantly performed even though the target MME 114 transmits an authentication request message in step 441.

Figure 5:
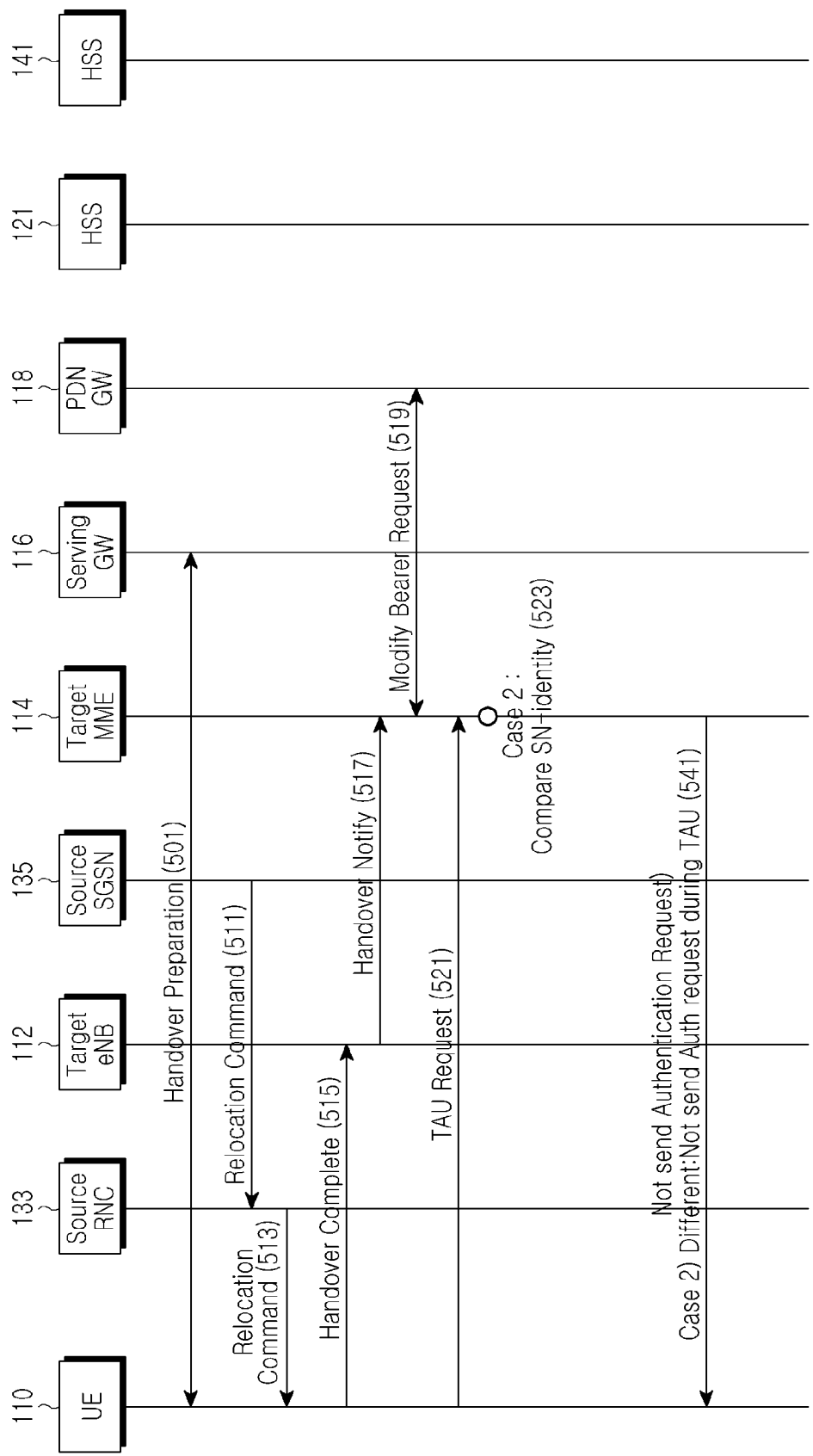
FIG. 5 is a message flow diagram illustrating an authentication process during a handover between PLMNs according to another exemplary embodiment of the present invention.

FIG. 5 is a message flow diagram illustrating an authentication process during a handover between PLMNs according to another exemplary embodiment of the present invention.

Referring to FIG. 5, the exemplary embodiment of the present invention is described in relation to an example which is hereafter referred to as SMC case 2.

Step 501 corresponds to a handover preparation step. Step 501 is identical to the handover preparation step 201, so a detailed description thereof will be omitted here.

In step 511, the source MME/SGSN 135 sends a relocation command message to the source eNB/RNC 133, thereby notifying the source eNB/RNC 133 that the handover preparation step has been completed. Then, the source eNB/RNC 133 transmits a handover command message to the UE 110 in step 513, and the UE 110 issues a handover command to the target eNB 112. When the UE 110 completes the handover process to the target eNB 112 in step 515, the target eNB 112 transmits a handover notification message to the target MME 114 in step 517. Thereafter, in step 519, if there is a change in the serving GW 116, etc., a bearer modification request is made by the target MME 114, the serving GW 116, the PDN GW 118, etc. In step 521, during the handover process, the UE 110 transmits a Tracking Area Update (TAU) request message to the target MME 114. Thereafter, in step 523, the target MME 114 compares the PLMN ID of the MME 114 itself with the PLMN ID included in the information transmitted from the UE 110. Then, in step 541, when the two IDs are different, which implies that the serving network identities (PLMN identities) are different, the MME 114 does not send an authentication request message to the UE 110 until the processing of the TAU request message in step 521 is completed.

Figure 6:
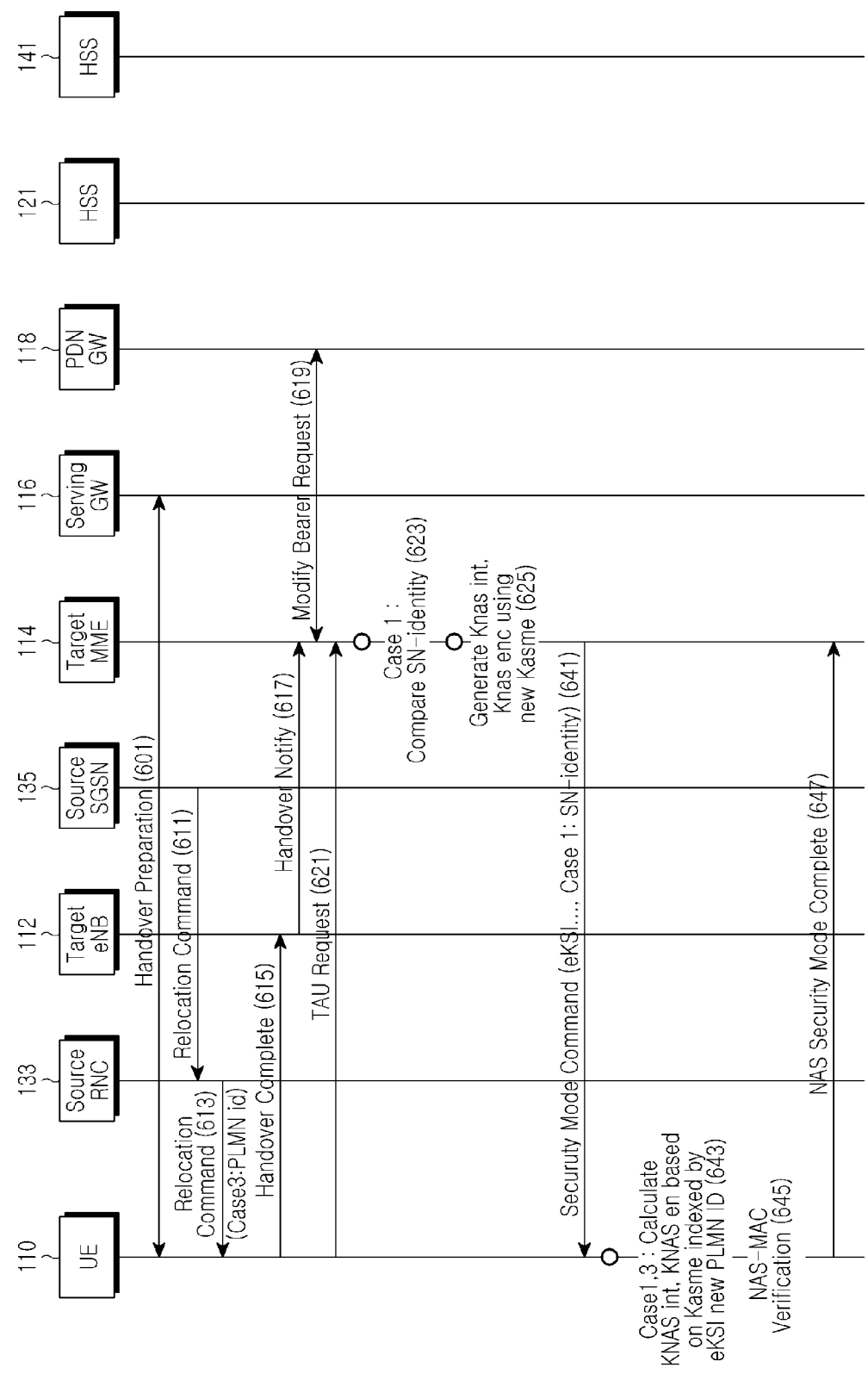
FIG. 6 is a message flow diagram illustrating a Security Mode Command (SMC) process during a handover between PLMNs according to an exemplary embodiment of the present invention.

FIG. 6 is a message flow diagram illustrating a Security Mode Command (SMC) process during a handover between PLMNs according to an exemplary embodiment of the present invention.

Referring to FIG. 6, the exemplary embodiment of the present invention is described in relation to the example identified as SMC case 1.

Step 601 corresponds to a handover preparation step. Step 601 is identical to the handover preparation step 201, so a detailed description thereof will be omitted here.

In step 611, the source MME/SGSN 135 sends a relocation command message to the source eNB/RNC 133, thereby notifying the source eNB/RNC 133 that the handover preparation step has been completed. Then, the source eNB/RNC 133 transmits a handover command message to the UE 110 in step 613, and the UE 110 issues a handover command to the target eNB 112. When the UE 110 completes the handover process to the target eNB 112 in step 615, the target eNB 112 transmits a handover notification message to the target MME 116 in step 617. Thereafter, in step 619, if there is a change in the serving GW 116, etc., a bearer modification request is made by the target MME 116, the serving GW 116, the PDN GW 118, etc. In step 621, during the handover process, the UE 110 transmits a Tracking Area Update (TAU) request message to the target MME 116. Thereafter, in step 623, the target MME 116 compares the PLMN ID of the MME 116 itself with the PLMN ID included in the information transmitted from the UE 110. When the two IDs are different and the target MME 114 has acquired an authentication key ($K_{ASME}$) for a new PLMN identity, the target MME 114 generates a NAS integrity key ($K_{NAS}$int) and a NAS encryption key ($K_{NAS}$enc) in step 625. Thereafter, in step 641, the target MME 114 inserts a serving network identity (i.e., a PLMN identity) in a Security Mode Command (SMC) message and transmits the SMC message to the UE 110. In step 643, the UE 110 acquires an authentication key through a NAS Key Set Identity (eKSI). At this time, the UE 110 acquires the authentication key through an eKSI corresponding to the corresponding PLMN identity by using the newly received PLMN identity information, and generates a NAS integrity key ($K_{NAS}$int) and a NAS encryption key ($K_{NAS}$enc) from the authentication key. Thereafter, in step 645, the UE 110 verifies a NAS Message Authentication Code (MAC) by using the NAS integrity key ($K_{NAS}$int). When the verification is a success, the UE 110 transmits a NAS security mode completion message in step 647.

Although FIG. 6 is based on an assumption that there is no transfer of a PLMN identity by the eNB/RNC 133 through a handover command in step 613, a PLMN identity may be transferred through a handover command by the eNB/RNC 133 in step 613 in the case of another exemplary embodiment of the present invention described in relation to an example which is hereinafter referred to as SMC case 3. Then, even when the TAU request message has been transmitted from the UE 110 to the target MME 114 as in step 621, the UE 110 and the MME 114 can have the same PLMN ID even without performing steps 623 to 641. Therefore, the authentication process, security process, and communication thereafter can be incessantly performed even though the target MME 114 transmits an SMC message in step 641.

Figure 7:
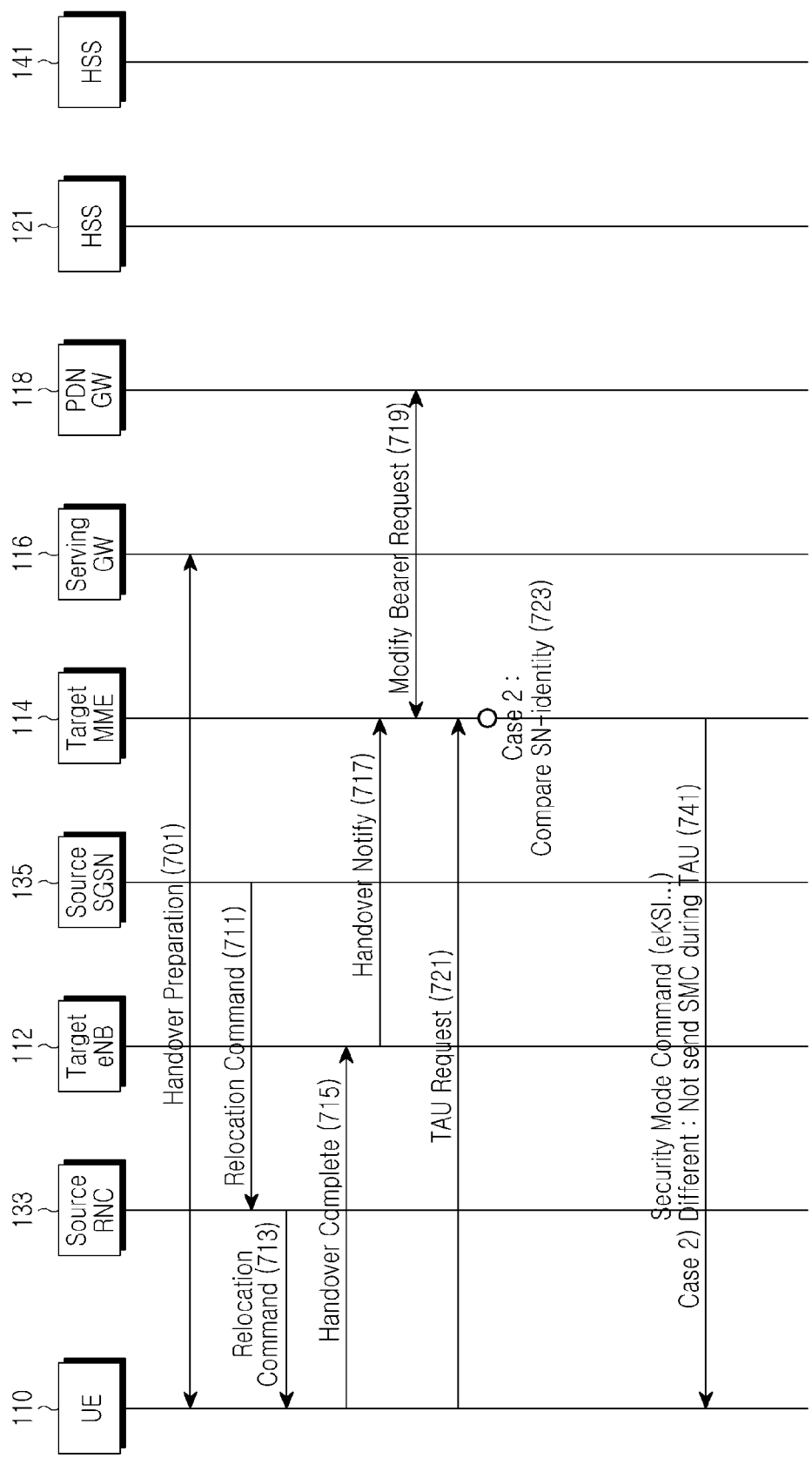
FIG. 7 is a message flow diagram illustrating an SMC process during a handover between PLMNs according to another exemplary embodiment of the present invention.

FIG. 7 is a message flow diagram illustrating an SMC process during a handover between PLMNs according to another exemplary embodiment of the present invention.

Referring to FIG. 7, the exemplary embodiment of the present invention is described in relation to the example identified as SMC case 2.

Step 701 corresponds to a handover preparation step. Step 701 is identical to the handover preparation step 201, so a detailed description thereof will be omitted here.

In step 711, the source MME/SGSN 135 sends a relocation command message to the source eNB/RNC 133, thereby notifying the source eNB/RNC 133 that the handover preparation step has been completed. Then, the source eNB/RNC 133 transmits a handover command message to the UE 110 in step 713, and the UE 110 issues a handover command to the target eNB 112. When the UE 110 completes the handover process to the target eNB 112 in step 715, the target eNB 112 transmits a handover notification message to the target MME 114 in step 717. Thereafter, in step 719, if there is a change in the serving GW 116, etc., a bearer modification request is made by the target MME 114, the serving GW 116, the PDN GW 118, etc. In step 721, during the handover process, the UE 110 transmits a Tracking Area Update (TAU) request message to the target MME 114. Thereafter, in step 723, the target MME 114 compares the PLMN ID of the MME 114 itself with the PLMN ID included in the information transmitted from the UE 110. Then, in step 741, when the two PLMN identities are different and the target MME 114 has acquired an authentication key ($K_{ASME}$) for a new PLMN identity through an authentication process, the target MME 114 does not send an SMC message based on the new authentication key to the UE 110 until the processing of the TAU request message is completed.

Figure 8:
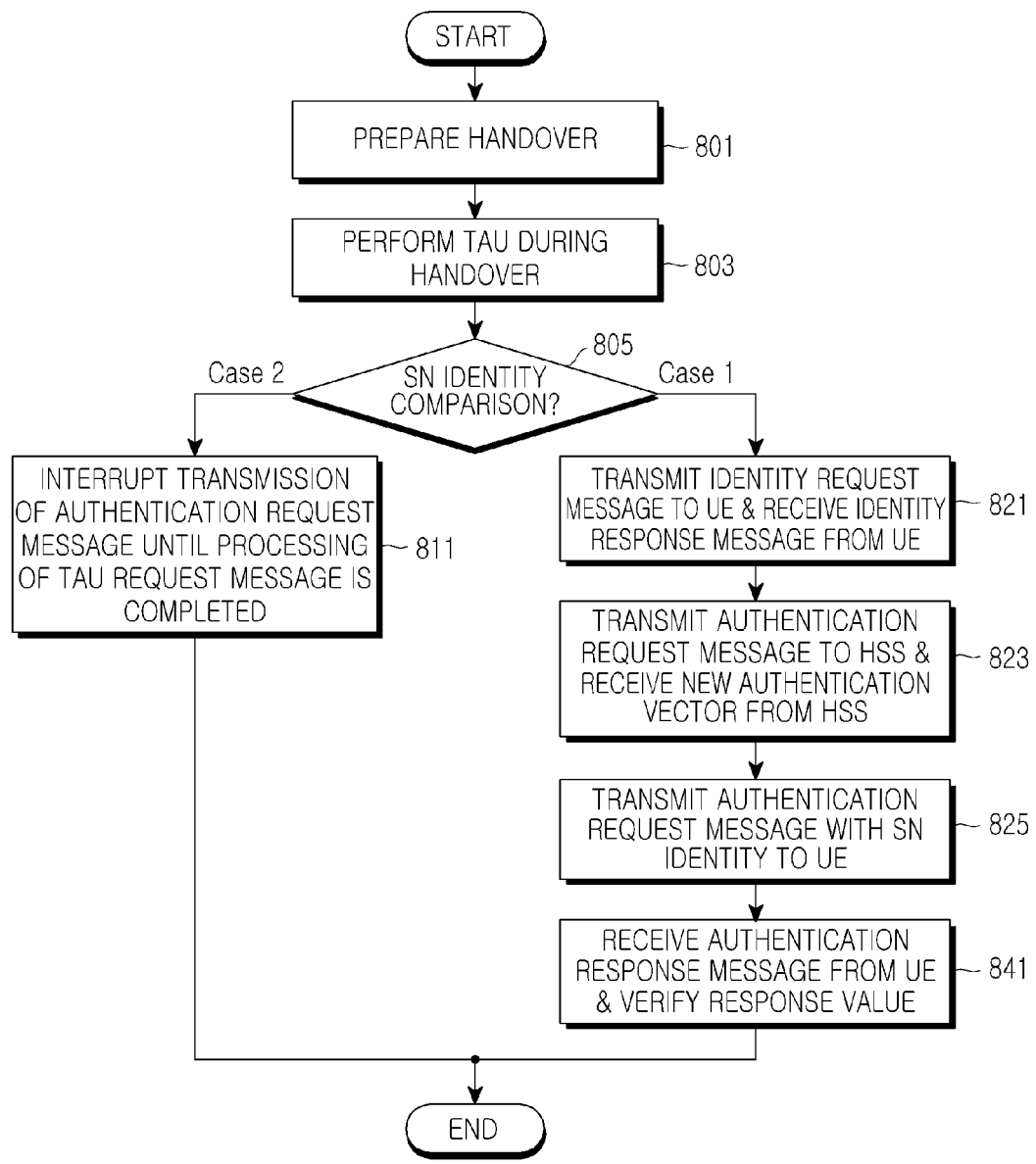
FIG. 8 is a flowchart illustrating an operation of a Mobile Management Entity (MME) for supporting an authentication process during a handover between PLMNs according to an exemplary embodiment of the present invention.

FIG. 8 is a flowchart illustrating an operation of an MME for supporting an authentication process during a handover between PLMNs according to an exemplary embodiment of the present invention.

Referring to FIG. 8, in step 801, the target MME 114 performs a handover preparation process. Step 801 is identical to the handover preparation step 201, so a detailed description thereof will be omitted here. In step 803, the target MME 114 performs a process before receiving a TAU request message among the handover process. In step 805, the target MME 114 determines the serving network identity (i.e., PLMN identity) through various comparisons, for example, by comparing the PLMN ID of the target MME 114 with a PLMN ID within an old GUTI of the TAU message transmitted from the UE 110 or by comparing the PLMN ID of the target MME 114 with a PLMN ID of a last-visited TAI within the TAU message transmitted from the UE 110. When the PLMN IDs are different, one solution is that the target MME 114 does not send an authentication request message to the UE 110 until the processing of the TAU message is completed as in step 811. Another solution (e.g., case 1) is that the target MME 114 sends an identity request message to the UE 110 and receives an identity response message from the UE 110 as in step 821. Thereafter, as in step 823, the target MME 114 transmits an authentication data request message to the HSS 141 by using UE identity information and receives a new authentication vector as a response. In step 825, the target MME 114 sends an authentication request message together with a serving network ID (i.e. PLMN ID) to the UE 110. Then, in step 841, the target MME 114 receives an authentication response message and verifies the response value.

Figure 9:
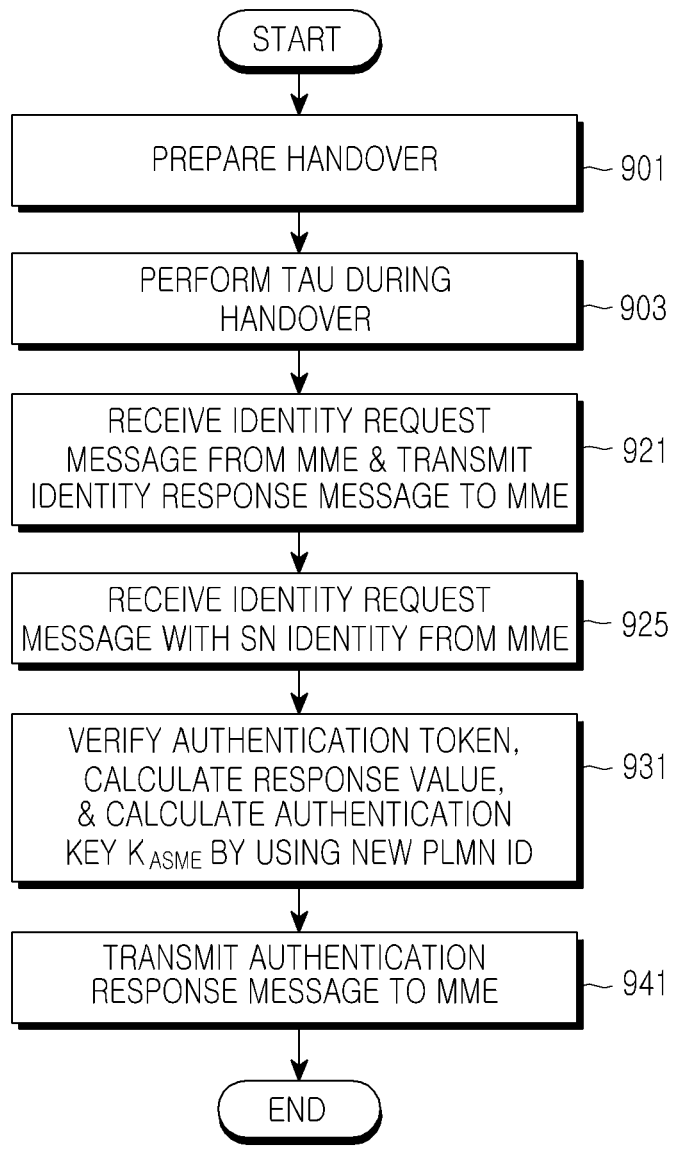
FIG. 9 is a flowchart illustrating an operation of a UE for supporting an authentication process during a handover between PLMNs according to an exemplary embodiment of the present invention.

FIG. 9 is a flowchart illustrating an operation of a UE for supporting an authentication process during a handover between PLMNs according to an exemplary embodiment of the present invention.

Referring to FIG. 9, in step 901, the UE 110 performs a handover preparation process. Step 901 is identical to the handover preparation step 201, so a detailed description thereof will be omitted here. In step 903, the UE 110 performs a process before sending a TAU request message among the handover process. In step 921, the UE 110 receives an identity request message from the target MME 114 and sends an identity response message to the target MME 114 as a response to the identity request message in step 921. In step 925, the UE 110 receives an authentication request message including a serving network ID (i.e., PLMN ID) from the target MME 114. Then, in step 931, the UE 110 verifies an authentication token, calculates a response value (RES), and calculates an authentication key ($K_{ASME}$) by using the serving network ID. Thereafter, in step 941, the UE 110 transmits an authentication response message to the target MME 114.

Figure 10:
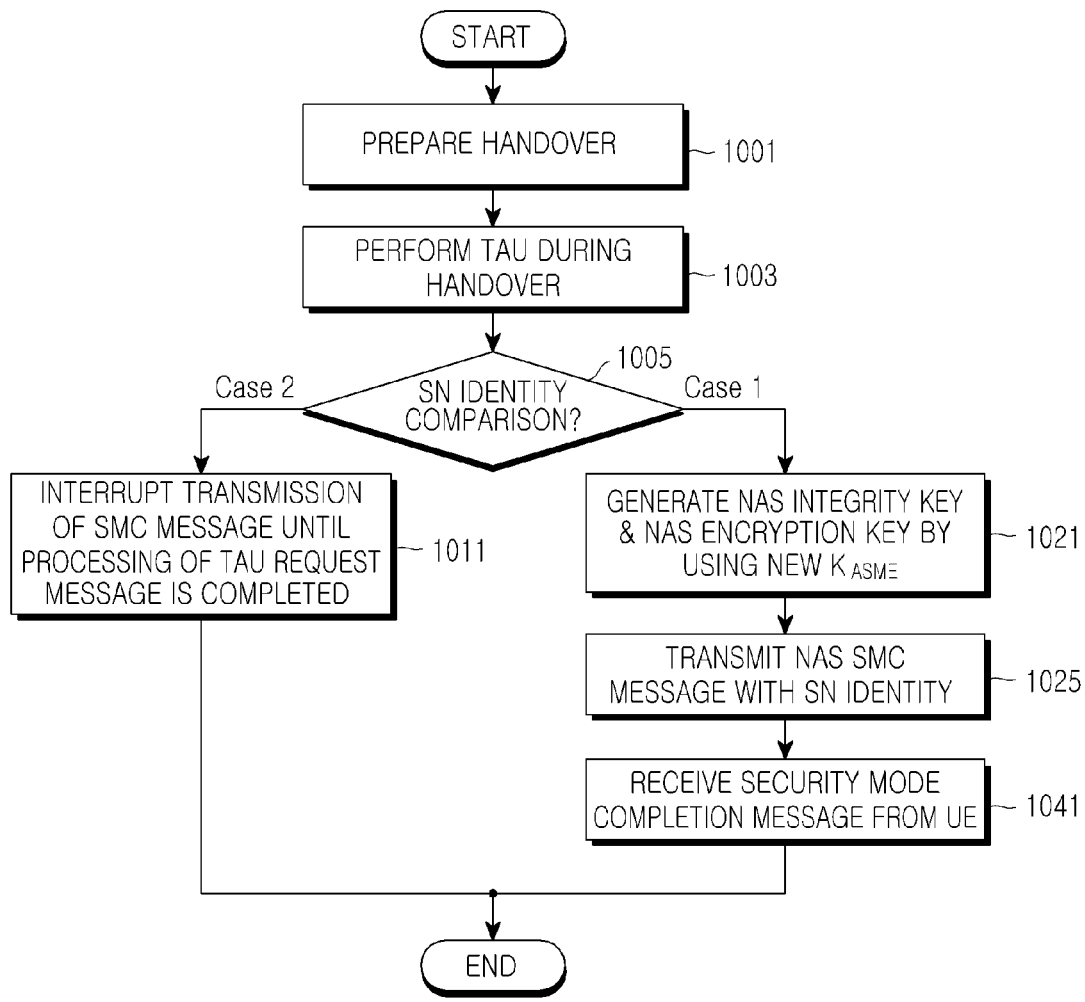
FIG. 10 is a flowchart illustrating an operation of an MME for supporting an SMC process during a handover between PLMNs according to an exemplary embodiment of the present invention.

FIG. 10 is a flowchart illustrating an operation of an MME for supporting an SMC process during a handover between PLMNs according to an exemplary embodiment of the present invention.

Referring to FIG. 10, in step 1001, the target MME 114 performs a handover preparation process. Step 1001 is identical to the handover preparation step 201, so a detailed description thereof will be omitted here. In step 1003, the target MME 114 performs a process before receiving a TAU request message among the entire handover process. In step 1005, the target MME 114 determines the serving network identity (i.e., PLMN identity) through various comparisons, for example, by comparing the PLMN ID of the target MME 114 with a PLMN ID within an old GUTI of the TAU message transmitted from the UE 110 or by comparing the PLMN ID of the target MME 114 with a PLMN ID of a last-visited TAI within the TAU message transmitted from the UE 110. When the PLMN IDs are different, one solution is that the target MME 114 does not send an SMC message to the UE 110 until the processing of the TAU message is completed as in step 1011. Another solution (e.g., case 1) is that, when the MME 114 has acquired a new authentication key ($K_{ASME}$) through a new authentication, the target MME 114 generates a NAS encryption key and a NAS integrity key as in step 1021. Then, in step 1025, the target MME 114 sends a NAS SMC message together with a serving network ID (i.e., PLMN ID) to the UE 110. Then, in step 1041, the target MME 114 receives a security mode completion message from the UE 110.

Figure 11:
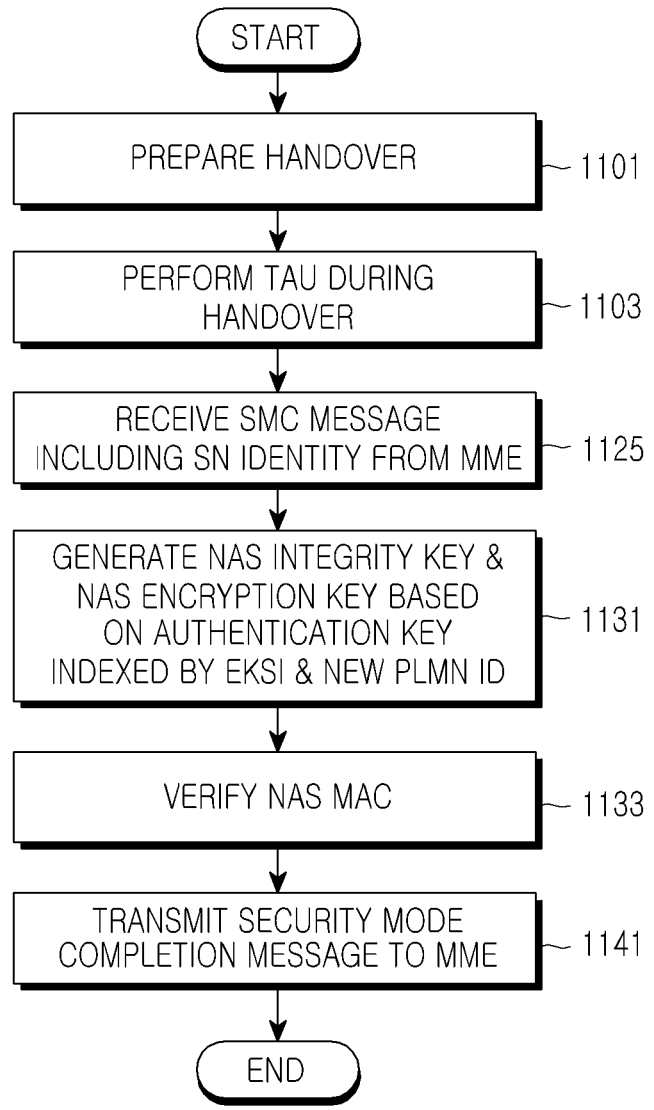
FIG. 11 is a flowchart illustrating an operation of a User Equipment (UE) for supporting an SMC process during a handover between PLMNs according to an exemplary embodiment of the present invention.

FIG. 11 is a flowchart illustrating an operation of a UE for supporting an SMC process during a handover between PLMNs according to an exemplary embodiment of the present invention.

Referring to FIG. 11, in step 1101, the UE 110 performs a handover preparation process. Step 1101 is identical to the handover preparation step 201, so a detailed description thereof will be omitted here. In step 1103, the UE 110 performs a process before sending a TAU request message among the entire handover process. In step 1125, the UE 110 receives an SMC message including a serving network ID (i.e., PLMN ID) from the target MME 114. Then, in step 1131, the UE 110 generates a NAS encryption key and a NAS integrity key based on an authentication key indexed by an eKSI, wherein the UE 110 finds an eKSI corresponding to the newly received PLMN ID. In step 1133, the UE 110 verifies a Message Authentication Code (MAC) by using the NAS integrity key. Thereafter, in step 1141, the UE 110 transmits a security mode completion message to the target MME 114.

According to exemplary embodiments of the present invention, as described above with reference to FIGS. 4 to 11, it may be necessary to support messages shown in Tables 1 to 3 for operations of the UE and the MME, which will be described hereinafter.

Table 1 below shows types of authentication request messages according to exemplary embodiments of the present invention. Although the message types shown in Table 1 are used when the messages are transmitted from the target MME 114 to the UE 110 as in step 441 of FIG. 4, exemplary embodiments of the present invention are not limited to the shown message types. Detailed information on the PLMN IDs of Table 1 can be referred to Table 3.

TABLE 1

| IEI | Information element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Authentication request message type | Message type 9.8 | M | V | 1 |
| | NAS key set identifier$_{ASME}$ | NAS key set identifier 9.9.3.21 | M | V | ½ |
| | Spare half octet | Spare half octet 9.9.2.9 | M | V | ½ |
| | Authentication parameter RAND (EPS challenge) | Authentication parameter RAND 9.9.3.3 | M | V | 16 |
| | Authentication parameter AUTN (EPS challenge) | Authentication parameter AUTN 9.9.3.2 | M | LV | 17 |
| | PLMN Identity | PLMN identity x.x.x.x (spec section number) | O | V | 3 |

Table 2 below shows types of SMC messages according to exemplary embodiments of the present invention. Although the message types shown in Table 2 are used when the messages are transmitted from the target MME 114 to the UE 110 as in step 641 of FIG. 6, exemplary embodiments of the present invention are not limited to the shown message types. Detailed information on the PLMN IDs of Table 2 can be referred to Table 3.

TABLE 2

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Security mode command message identity | Message type 9.8 | M | V | 1 |
| | Selected NAS security algorithms | NAS security algorithms 9.9.3.23 | M | V | 1 |
| | NAS key set identifier | NAS key set identifier 9.9.3.21 | M | V | ½ |
| | Spare half octet | Spare half octet 9.9.2.9 | M | V | ½ |
| | Replayed UE security capabilities | UE security capability 9.9.3.36 | M | LV | 3-6 |
| C- | IMEISV request | IMEISV request 9.9.3.18 | O | TV | 1 |
| 55 | Replayed nonce$_{UE}$ | Nonce 9.9.3.25 | O | TV | 5 |
| 56 | Nonce$_{MME}$ | Nonce 9.9.3.25 | O | TV | 5 |
| | PLMN Identity | PLMN identity x.x.x.x | O | V | 3 |

Table 3 below shows PLMN ID Information Elements (IEs) included in the authentication request message or the SMC message of Tables 1 and 2 according to exemplary embodiments of the present invention, which correspond to IEs for notifying of information to be included in order to send the PLMN identities to the UE 110. Further, the PLMN ID IEs are not limited to the message types shown in Table 3. The PLMN ID IEs are IEs of type 3 and have a length of 4 octets. The MCC indicates a Mobile Country Code, in which octet 2 and octet 3 are configured in bits 1 to 4, and the MNC indicates a Mobile Network Code, in which octet 4 and octet 3 are configured in bits 5 to 8.

TABLE 3

| 8 | 7 | 6 | 5 | 4 | 3 | 2 | 1 | |
|---|---|---|---|---|---|---|---|---|
| PLMN identity IEI | | | | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |

MCC, Mobile country code (octet 3, octet 4 bits 1 to 4)
The MCC field is coded as in ITU-T Rec. E212, Annex A.
MNC, Mobile network code (octet 5, octet 4 bits 5 to 8).
The coding of this field is the responsibility of each administration but BCD coding shall be used. The MNC shall consist of 2 or 3 digits. For PCS 1900 for NA, Federal regulation mandates that a 3-digit MNC shall be used. However a network operator may decide to use only two digits in the MNC over the radio interface. In this case, bits 5 to 8 of octet 4 shall be coded as "1111". Mobile equipment shall accept MNC coded in such a way.

In a mobile communication network according to exemplary embodiments of the present invention, when a UE performs a handover between PLMNs, especially when a UE performs a handover from a EUTRAN or another RAT (e.g., such as GETRAN or UTRAN) to another EUTRAN, it is possible to resolve problems associated with the authentication and security of the UE, thereby preventing interruption of communication.

Further, exemplary embodiments of the present invention propose a method capable of smoothly performing an authentication of a UE and a security mode command for the UE even during a handover of the UE between PLMNs by using a NAS protocol, so as to achieve an efficient mobility management of the UE.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a security procedure by a mobility management entity (MME) in a mobile communication system, the method comprising:
   receiving, from a terminal, a tracking area update (TAU) request message including a public land mobile network identity (PLMN ID) after a handover of the terminal;
   comparing the PLMN ID included in the TAU request message with a PLMN ID of a cell; and
   transmitting, to the terminal, an authentication request message if the PLMN ID included in the TAU request message is different from the PLMN ID of the cell and a TAU procedure is complete,
   wherein the PLMN ID is included in an old globally unique temporary identifier (GUTI) included in the TAU request message.

2. The method of claim 1, wherein the terminal is camped on the cell.

3. The method of claim 1, further comprising:
   transmitting a TAU response message to the terminal in response to the TAU request message.

4. The method of claim 1, further comprising:
   receiving an authentication response message from the terminal if an authentication vector is verified.

5. The method of claim 1, further comprising:
   transmitting a security mode command (SMC) message to the terminal if the PLMN ID included in the TAU request message is different from the PLMN ID of the cell and the TAU procedure is complete.

6. The method of claim 1, wherein the PLMN ID of the cell is one of a plurality of PLMN IDs managed by the MME.

7. The method of claim 1, further comprising:
   transmitting, by at least one of a source MME or a serving general packet radio service (GPRS) support node (SGSN), a relocation command message to at least one of a source evolved Node B (eNB) or a radio network controller (RNC);
   transmitting, by the source eNB or the RNC, a handover command message to the terminal; and
   transmitting, by a target eNB, to a target SGSN a handover notification message if the terminal completes the handover to the target eNB.

8. The method of claim 1, wherein, if the PLMN ID included in the TAU request message is different from the PLMN ID of the cell, the method further comprises:
   generating a request for an identity of the terminal to the terminal;
   receiving the identity of the terminal from the terminal;
   transmitting the received identity of the terminal and the PLMN ID of the cell to a home subscriber server (HSS);
   receiving an authentication key and an authentication vector from the HSS;
   transmitting an authentication request message including the authentication key, the authentication vector, and the PLMN ID of the cell to the terminal; and
   receiving a response message to the authentication request message from the terminal.

9. The method of claim 8, further comprising:
   verifying if the response message is an authentication response message received from the terminal, to which the MME has sent the authentication request message, by comparing an authentication key included in the response message with an expected authentication key.

10. A mobility management entity (MME) apparatus for performing a security procedure in a mobile communication system, the MME apparatus comprising:
    a transceiver configured to transmit and receive messages; and
    a controller configured to:
      receive, from a terminal, a tracking area update (TAU) request message including a public land mobile network identity (PLMN ID) after a handover of the terminal,
      compare the PLMN ID included in the TAU request message with a PLMN ID of a cell, and
      transmit, to the terminal, an authentication request message if the PLMN ID included in the TAU request message is different from the PLMN ID of the cell and a TAU procedure is complete,
    wherein the PLMN ID is included in an old globally unique temporary identifier (GUTI) included in the TAU request message.

11. The apparatus of claim 10, wherein the terminal is camped on the cell.

12. The apparatus of claim 10, wherein the transceiver is further configured to transmit a TAU response message to the terminal in response to the TAU request message.

13. The apparatus of claim 10, wherein the transceiver is further configured to receive an authentication response message from the terminal if an authentication vector is verified.

14. The apparatus of claim 10, wherein the controller is further configured to transmit a security mode command (SMC) message to the terminal if the PLMN ID included in the TAU request message is different from the PLMN ID of the cell and the TAU procedure is complete.

15. The apparatus of claim 10, wherein the PLMN ID of the cell is one of a plurality of PLMN IDs managed by the MME.

16. The apparatus of claim 10, wherein, if the PLMN ID included in the TAU request message is different from the PLMN ID of the cell, the controller is further configured to:
- generate a request for an identity of the terminal to the terminal,
- receive the identity of the terminal from the terminal,
- transmit the received identity of the terminal and the PLMN ID of the cell to a home subscriber server (HSS),
- receive an authentication key and an authentication vector from the HSS,
- transmit an authentication request message including the authentication key, the authentication vector, and the PLMN ID of the cell to the terminal, and
- receive a response message to the authentication request message from the terminal.

17. The apparatus of claim 16, wherein the controller is further configured to verify if the response message is an authentication response message received from the terminal, to which the MME has sent the authentication request message, by comparing an authentication key included in the response message with an expected authentication key.

* * * * *